(12) United States Patent
Lee et al.

(10) Patent No.: US 8,619,659 B2
(45) Date of Patent: Dec. 31, 2013

(54) METHOD FOR TRANSMITTING MESSAGES RELATED TO A BROADCAST OR MULTICAST SERVICE IN A CELLULAR COMMUNICATIONS SYSTEM

(75) Inventors: Kook-Heui Lee, Yongin-si (KR); Gert-Jan Van Lieshout, Staines (GB); Himke Van Dervelde, Staines (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/615,807

(22) Filed: Nov. 10, 2009

(65) Prior Publication Data

US 2010/0061290 A1    Mar. 11, 2010

Related U.S. Application Data

(63) Continuation of application No. 11/029,702, filed on Jan. 5, 2005, now Pat. No. 7,688,771.

(30) Foreign Application Priority Data

Jan. 7, 2004    (GB) .................................. 0400255.6

(51) Int. Cl.
*H04H 20/71* (2008.01)
(52) U.S. Cl.
USPC ........ 370/312; 370/310; 370/310.2; 370/318; 370/395.1
(58) Field of Classification Search
USPC .................... 370/310, 310.2, 312, 318, 395.1
See application file for complete search history.

(56) References Cited

U.S. PATENT DOCUMENTS

| | | | |
|---|---|---|---|
| 5,878,033 A | 3/1999 | Mouly | |
| 6,188,911 B1 | 2/2001 | Wallentin et al. | |
| 6,256,509 B1 * | 7/2001 | Tanaka et al. | 455/515 |
| 6,778,521 B1 * | 8/2004 | Korpela et al. | 370/345 |
| 6,876,636 B2 * | 4/2005 | Sinnarajah et al. | 370/312 |
| 7,298,713 B2 * | 11/2007 | Goldberg et al. | 370/312 |
| 2003/0022683 A1 * | 1/2003 | Beckmann et al. | 455/518 |
| 2003/0096614 A1 * | 5/2003 | Paila | 455/450 |
| 2004/0014482 A1 | 1/2004 | Kwak et al. | |
| 2004/0087320 A1 | 5/2004 | Kim et al. | |

(Continued)

FOREIGN PATENT DOCUMENTS

| | | |
|---|---|---|
| CN | 1138807 | 12/1996 |
| EP | 0 928 119 | 7/1999 |

(Continued)

OTHER PUBLICATIONS

3GPP TR 25.922 V5.1.0; 3rd Generation Partnership Project; Technical Specification Group Radio Access Network; Radio Resource Management Strategies, (Release 5), pp. 34-39, Sep. 2003.

(Continued)

*Primary Examiner* — Liton Miah
(74) *Attorney, Agent, or Firm* — The Farrell Law Firm, P.C.

(57) ABSTRACT

A method of providing a point-to-point multicast service for transmitting data from a network element to a plurality of terminals in a communication system. The method includes transmitting a first message including service available information from the network element to the plurality of terminals, and transmitting a second message including radio bearer information from the network element to the plurality of terminals. The first message includes a pointer to the radio bearer information.

4 Claims, 4 Drawing Sheets

(56) References Cited

U.S. PATENT DOCUMENTS

| | | | |
|---|---|---|---|
| 2004/0103435 A1* | 5/2004 | Yi et al. | 725/81 |
| 2004/0105402 A1* | 6/2004 | Yi et al. | 370/312 |
| 2004/0127243 A1 | 7/2004 | Sarkkinen | |
| 2004/0152473 A1* | 8/2004 | Kuwano et al. | 455/456.2 |
| 2004/0227618 A1 | 11/2004 | Hwang et al. | |

FOREIGN PATENT DOCUMENTS

| | | |
|---|---|---|
| EP | 1 213 939 | 6/2002 |
| EP | 1 359 774 | 11/2003 |
| EP | 1 377 099 | 1/2004 |
| EP | 1 418 686 | 5/2004 |
| EP | 1 465 444 | 10/2004 |
| EP | 1 475 973 | 11/2004 |
| KR | 1020010023829 | 3/2001 |
| KR | 1020030081892 | 10/2003 |
| KR | 1020030086172 | 11/2003 |
| WO | WO 01/58179 | 8/2001 |
| WO | WO 03/015439 | 2/2003 |
| WO | WO 2004/013978 | 2/2004 |
| WO | WO 2004/017579 | 2/2004 |

OTHER PUBLICATIONS

Technical Specification Group Radio Access Network; Introduction of the Multimedia Broadcast Multicast Service (MBMS) in the Radio Access Network; Stage 2, Release 6, 3 GPP TS 25.346V2.4.0, Nov. 2003.

Technical Specification Group Radio Access Network; User Equipment (UE) Procedures in Idle Mode and Procedures for Cell Reselection in Connected Mode; Release 1999, 3 GPP TS 25.304 V3.13.0, Jun. 2003.

Samsung and Siemens, MBMS Notification for UEs in Idle and Cell_(URA_) PCH, 3 GPP TSG RAN WG2#37, Aug. 25-29, 2003.

* cited by examiner

METHOD FOR TRANSMITTING MESSAGES RELATED TO A BROADCAST OR MULTICAST SERVICE IN A CELLULAR COMMUNICATIONS SYSTEM

PRIORITY

This application is a Continuation of U.S. application Ser. No. 11/029,702, filed on Jan. 5, 2005, and claims priority to an application filed with the United Kingdom Patent Office on Jan. 7, 2004 and assigned Serial No. 0400255.6, the contents of which are incorporated herein by reference.

BACKGROUND OF THE INVENTION

1. Field of the Invention

This invention relates to a broadcast or multicast service in a telecommunications system. More explicitly, but not exclusively, the invention relates to the realisation of a Multicast Broadcast services in a radio access network (RAN) such as in the Universal Mobile Telecommunications Service (UMTS) radio access network. UMTS concerns a third generation radio network using wideband code division multiple access (W-CDMA) technology.

2. Description of the Related Art

Figure 1:
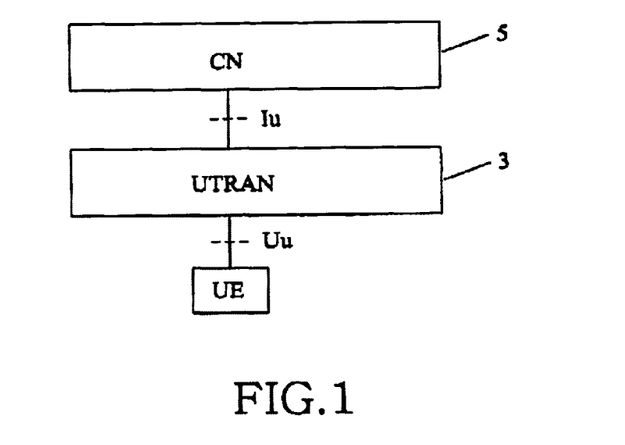
FIGS. 1 and 2 are schematic outlines of a mobile communications network, in which the present invention can be incorporated.

A cellular communications system includes mobile user equipment (UEs), a radio access network (RAN) and one or more core networks (CNs), as illustrated in FIG. 1 for the UMTS case. A detailed overview over the architecture of a cellular telecommunications system of the third generation may be found in the 3GPP specification "UTRAN Overall Description" 3GPP TS25.401 and related specifications. Communication between the UEs and the UTRAN is provided via the Uu interface (Uu), whereas the communication between the UTRAN and the core networks is done via the Iu interface (Iu).

A radio access network includes base stations and radio network controllers or base station controllers (RNC/BSC). The base stations handle the actual communication across the radio interface, covering a specific geographical area also referred to as a cell. The radio network like for example the allocation of radio resources and the control of local mobility. An RNC connects to one or more core networks via the Iu interface, to a number of base stations (node B's for the case of UTRAN) via the Iub interface and possibly to one or more other RNCs via the Iur interface. The core network includes a serving GPRS (General Packet Radio Service) support node (SGSN) and a broadcast/multicast-service centre (BM-SC). The BM-SC controls the distribution of the data to be transmitted via the MBMS service.

Communications Networks of the third generation (3G) such as the UMTS network provide Multimedia Broadcast Multicast Services (MBMS). MBMS is a point-to-multipoint service in which multimedia data such as audio, images or video data is transmitted from a single source entity to multiple recipients by using a uni-directional bearer service. The MBMS bearer service offers both a broadcast mode and a multicast mode. In the broadcast mode, the data are broadcasted to all users. In contrast, a user needs to subscribe to a particular MBMS service or a group of MBMS services with a service provider in order to receive multicast services. The operator may then announce the service or use a service discovery mechanism to inform users about the range of MBMS services available. If the user is interested in a particular MBMS service, the user joins the service, i.e. the user activates the MBMS multicast service. In this way the user becomes a member of a particular multicast group and indicates to the network that he or she wants to receive the MBMS data of a particular MBMS service.

Transmitting the same data to multiple recipients allows network resources to be shared. In this way the MBMS architecture is designed to enable an efficient usage of radio-network and core-network resources.

In order to initiate a MBMS session, the CN sends a session start command to the RNC. The Session Start command is used to indicate that the core network is ready to send data relating to a particular MBMS service. The Session Start command triggers the establishment of a bearer resource for MBMS data transfer. It is noted that the Session Start occurs independently of activation of the service by the user. This means that a user may activate a particular service either before or after a Session Start.

After receiving the Session Start command, the RNC send MBMS notifications to the UE in order to inform the UEs about forthcoming or even ongoing MBMS multicast data transfers. The RNC manages the use of the radio resources and decides whether the MBMS data will be transmitted using point to multipoint or point-to-point transfer mode on the radio interface. If there are sufficient UEs in a cell, the point-to-multipoint transfer mode is most efficient. If however the number of users in a cell is low, the point-to-point transfer mode may be most efficient. To decide which transfer mode to use, the RNC may perform a counting operation. Subsequently multimedia data relating to a particular MBMS service are transmitted from the CN via the RNC to the UEs during the data transfer phase.

When the BM-SC determines that there will be no more data to send, the CN sends a Session Stop command to the RNC and the bearer resources are released.

If a user is no longer interested in a particular MBMS service, the user deactivates the service. Accordingly, the user leaves the multicast group if he or she does no longer wants to receive Multicast mode data of a specific MBMS bearer service.

It is noted that the phase subscription, joining and leaving are performed individually per user. The other phases, such as the notification and the data transfer, are performed for a particular service, i.e. for all users interested in the related service.

As of 3GPP RAN2 meeting number 39 (17-21 Nov. 2003), the situation regarding how MBMS will be handled on the Uu interface has again become clearer. The current status of MBMS realisation in RAN2 is described in the 3GPP specification "Introduction of Multimedia Broadcast Multicast Service (MBMS) in the Radio Access Network (RAN)" TS 25.346. v2.4.0.

SUMMARY OF THE INVENTION

It is an object of the present invention to improve the way broadcast or multicast services are handled. According to an aspect of the present invention, there is provided a method of providing a point-to-point multicast service for transmitting data from a network element to a plurality of terminals in a communication system. The method includes: transmitting a first message including service available information from the network element to the plurality of terminals; and transmitting a second message including radio bearer information from the network element to the plurality of terminals. The first message includes a pointer to the radio bearer information.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF THE PREFERRED EMBODIMENT

Embodiments of the present invention will now be described in detail with reference to the accompanying drawings. In the following description, a detailed description of known functions and configurations incorporated herein has been omitted for conciseness.

Figure 2:
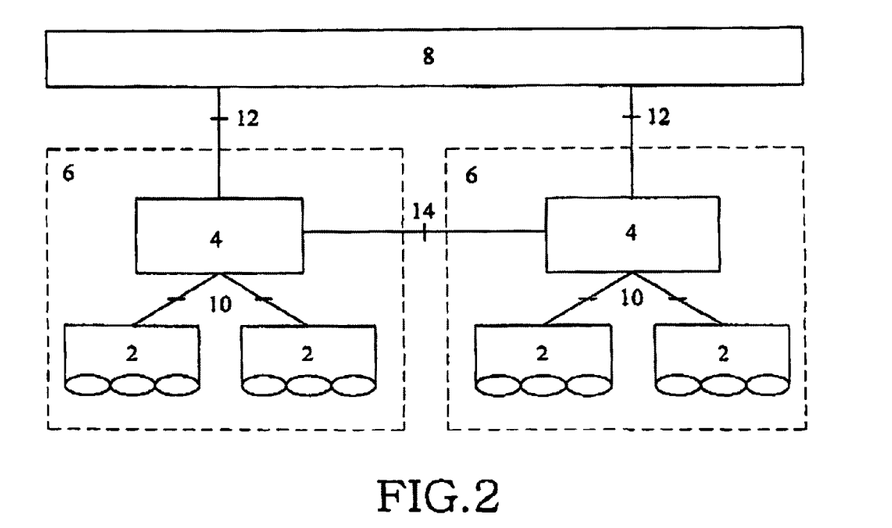

FIG. 2 illustrates the architecture of a radio access network. The RAN comprises base stations 2, such as the so-called Node B's for the UTRAN, and radio network controllers 4 (RNC), also referred to as base station controllers (BSC). The base stations 2 handle the actual communication across the radio interface, covering a specific geographical area also referred to as a cell. The RNCs 4 control the base stations 2 connected to it, and also include other functionality for tasks such as the allocation of radio resources, i.e. the local mobility. An RNC 4 is connected to one or more core networks 8 via the Iu interface 12, to a number of base stations 2 via the Iub interface 10 and possibly to one or more other RNCs 4 via the Iur interface 14.

In a UMTS network, the Radio Resource Control (RRC) protocol is used across the radio interface, i.e. between the UE and UTRAN. These protocol end points interact by exchanging protocol parameters, by sending messages comprising of one or more information elements.

In order to set up a MBMS session, the RNC receives a respective request from the CN. This MBMS Session Start Request contains a MBMS Service Identification, specifies the MBMS Bearer Service Type and MBMS Session Attributes such as the MBMS Service Area Information or Quality of Service parameters. After the RNC receives the MBMS Session Start Request, it notifies the UEs, which are interested in and have activated the particular MBMS service.

The MBMS Session Start Request contains all information necessary to set up an MBMS Radio Access Bearer (RAB). Upon reception of the Session Start message, the RNC executes an MBMS data bearer set up over the Iu interface, and subsequently informs the sending CN of the outcome of the set up in a MBMS Session Start response message.

For a particular MBMS service, data is then transferred via an MBMS RAB between the network and the UE.

In order to set up the connections between the RNC and the UE, the existing transport channel mechanism of the Forward Access Channel (FACH) over Iub is used in case of a point-to-multipoint (ptm) MBMS transmission. A ptm connection is established if the number of counted MBMS users in a cell exceeds a certain operator-defined threshold. Otherwise, a point-to-point (ptp) connection is established over the DTCH as defined for other dedicated services.

The CN sends the MBMS Session Stop command in a similar way to the RNC, and the RNC then notifies the interested and activated UEs of the end of the MBMS session. When the RNC receives an MBMS Session Stop Request, it releases the associated MBMS RAB resource.

Figure 3:
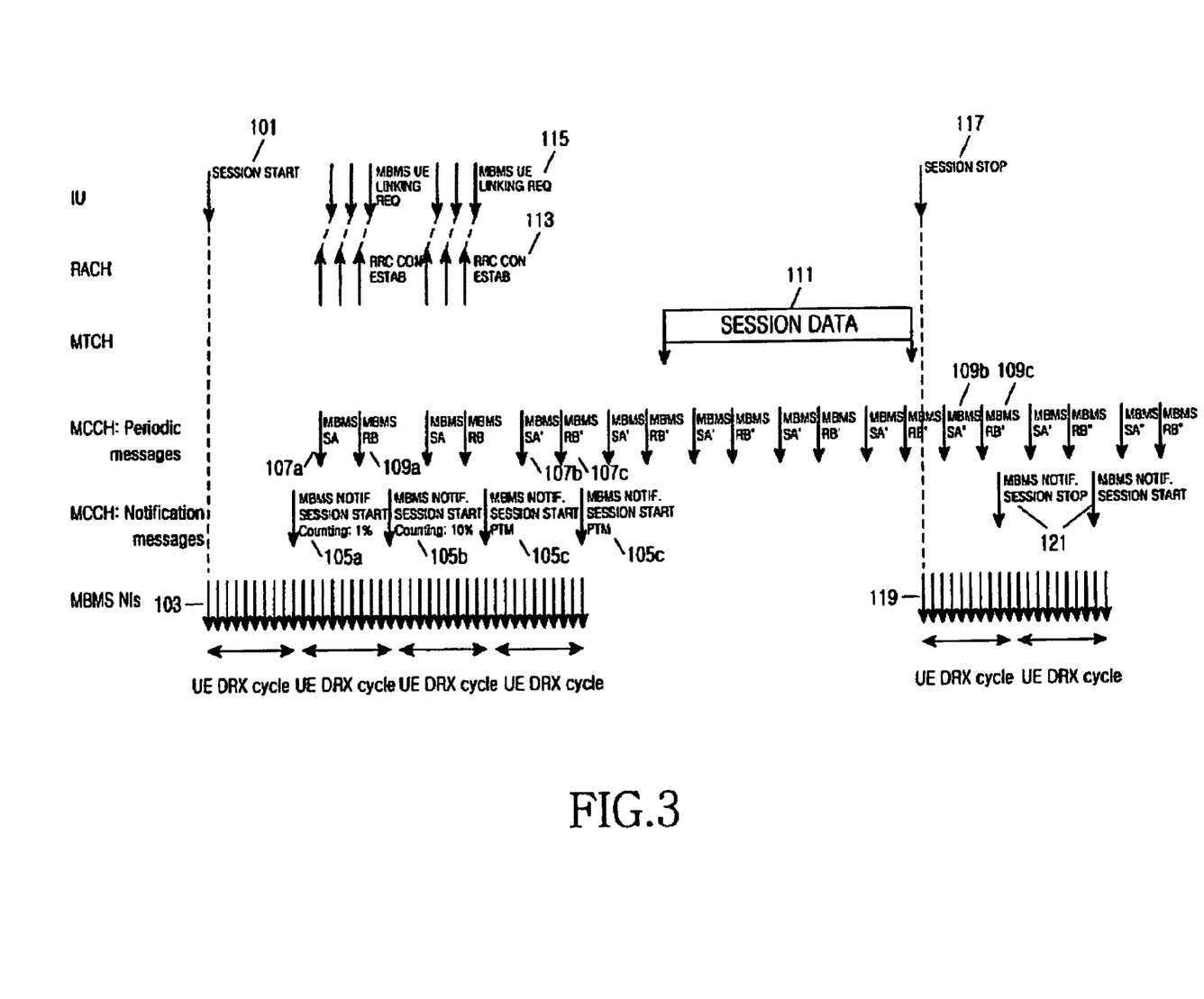
FIG. 3 is a schematic illustration of a messaging timeline of a MBMS session according to the prior art.

Referring now to FIG. 3, the sequence of main events that take place during a MBMS session is described. More details may be found in the 3GPP specification TS 25.346. The session is started when a SESSION START message 101 is received by the UTRAN over Iu, and terminated when the SESSION STOP message is received over Iu.

After the SESSION START message 101, the UTRAN sends out MBMS notification indicators (NI's) 103 in order to wake-up UE's in RRC_Idle, CELL_PCH, URA_PCH and CELL_FACH states. The MBMS notification indicators 103 are sent on the MBMS notification Indicator channel (MICH). UE's only need to wake-up and look for the MBMS NI's at their normal paging occasions, i.e. the paging occasion for the normal UE DRX cycle used for conventional (R99) paging. As a result, the MBMS notification indicators 103 sent by the network have to be repeated continuously during one or more UE DRX cycles.

If a UE detects that an MBMS NI 103 is set for an MBMS service in which it is interested, the UE listens to the MBMS point-to-multipoint Control Channel (MCCH). It has been agreed that transmissions on MCCH will be scheduled, although this is not specifically described in the 3GPP specification 25.346. Thus, all UEs receiving the MBMS NIs 103 during a certain specified period will all listen to the MCCH at one specific instance, in this document referred to as the MCCH notification occasion. The specified period is typically the largest UE DRX cycle. It is assumed that the MCCH notification occasion configuration is broadcast on BCCH or MCCH.

The message sent every DRX cycle at the MCCH notification occasion is the MBMS NOTIFICATION message 105. This message 105 will at session start typically first trigger a counting procedure by indicating that a certain percentage, the so-called "counting probability", of UEs interested in the session being started should respond by establishing an RRC connection. It is noted that the MBMS Notification message has not yet been described in 3GPP specification 25.346.

After the UE receives the MBMS notification message 105a, it sends a request 113 to establish an RRC connection to the core network to allow for the counting process. The request 113 includes a Service identification (ID), which identifies the MBMS service the UE is interested in. As a response, the CN identifies the MBMS service the UE is interested in and sends a MBMS Linking Request Message 115 over the Iu interface.

As soon as the UEs receive an "interesting" MBMS NI 103, the UE shall listen to the MCCH at the MCCH notification occasions. An "interesting" MBMS NI in this respect means that the NI relates to any of the MBMS services the UE has joined. After the first MBMS Notification message 105a has been sent, the one or more subsequent MBMS Notification messages 105b may contain different counting probabilities. In this way the UTRAN determines whether the MBMS service should be provided by point-to-point or point-to-multipoint (ptp/ptm). By having higher counting probability at subsequent counting cycles, the UTRAN is able to obtain a gradual idea about how many UEs in the cell are interested in a specific MBMS service, and can then decide whether the MBMS service shall be provided ptp or ptm.

When the UTRAN has taken the ptp/ptm decision, the counting process will be stopped. In case ptp is selected, the interested UE's will receive a RADIO BEARER SETUP message. FIG. 3 illustrates the case that the service is provide by ptm. In this case the UTRAN configures the MBMS point-to-multipoint Traffic Channel (MTCH) and updates the MCCH by sending the MBMS SERVICE INFORMATION message 107 and MBMS RADIO BEARER INFORMATION message 109. The two messages include the service identification and radio bearer information for the MBMS service.

After the UE has read the MBMS SERVICE INFORMATION messages 107 and MBMS RADIO BEARER INFORMATION messages 109, it is able to read the MBMS data transmissions 111 on the corresponding MTCH.

When transmission of the MBMS session is finalised and the SESSION STOP message 117 is received over Iu, the UE will be informed about the session stop by a RADIO BEARER RELEASE message in case of ptp or a SESSION STOP notification 121 for ptm transmission. In order to ensure that all UEs detect the SESSION STOP notification, the UTRAN send again MBMS NIs 119, such that the interested UE listens to the MCCH.

Usage of MCCH Notification Occasion Interval

As can be seen from the schematic illustration of FIG. 3, the above described solution provides for one MCCH notification message at every MCCH notification occasion, with a fixed period between MCCH notification occasions equal to the (largest) UE DRX cycle. This appears as a simple and natural solution, as all UEs, which are receiving the MBMS NI in one DRX cycle, are also reading the same MCCH message.

However this approach has the disadvantage that the total time period the MBMS NI have to be sent for a particular MBMS session are relatively long.

As an example, it is assumed that the error rate for transmitting the MBMS NI is 1%, and that the intervals between the MCCH notification occasions are equal to the UE DRX cycle of 1.28 seconds. Moreover, it is assumed that the UTRAN requires three cycles with different counting probabilities to decide whether the MBMS session is to be transmitted in the ptp or in the ptm mode.

Due to the MBMS NI error rate, the MBMS NI's have to be set at least during two different DRX cycles when the ptm decision is taken. Thus in total at session start, we will have to set the corresponding MBMS NI's during 5 UE DRX cycles (3+2): more than 7 seconds of continuous MBMS NI's. If we include the two DRX cycles we will need to inform all UE's of the Session termination, in total the MBMS PI's will be set for more than 10 seconds per session.

It is therefore advantageous to provide a MCCH notification occasion interval different to the longest UE DRX period. If a MCCH notification occasion interval is used which is shorter than the longest UE DRX cycle, the total time required to set up a MBMS session can be reduced.

First Embodiment

According to a first embodiment, this can be achieved by providing additional MCCH notification occasions. The network signals an MCCH notification occasion schedule to the UE. For signalling the schedule the BCCH may for example be used. In addition, it is specified that instead of listening only to one MCCH notification occasion, the UE shall listen to all scheduled MCCH notification occasions starting from the moment it detects the MBMS NI and up to the next dedicated paging occasion. In this way an MCCH notification occasion interval of less than the normal DRX cycle can be achieved.

Figure 4:
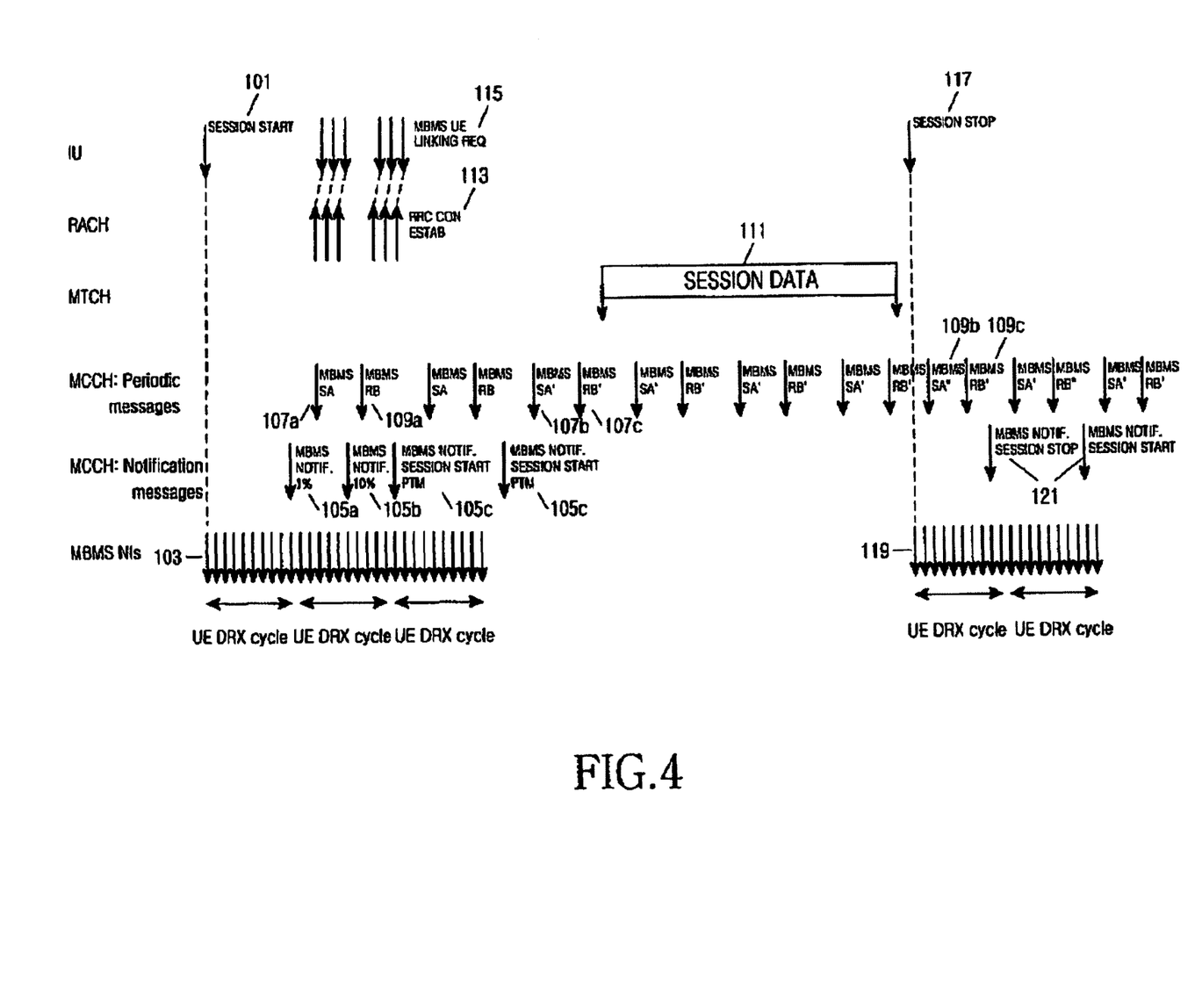
FIG. 4 is a schematic illustration of a messaging timeline of a MBMS session according to one embodiment of the present invention.

It is now referred to FIG. 4, which illustrates the messaging for an MBMS session having an MCCH notification occasion interval of half of the normal DRX cycle. The same reference numerals as in FIG. 3 are used for corresponding messages.

It can be seen that the second MCCH notification message 105b follows the first message 105a after a half UE DRX cycle. Therefore, the duration of the MBMS notifications CRX cycle is half of the longest UE DRX cycle. In this way the delay introduced by the counting procedure, i.e. from the session start message 101 to the MBMS notification 105c, indicating that the session is broadcast over ptm, is only two cycles rather than three cycles in the prior art MBMS session as outlined in FIG. 3.

However, in practice there is a limit to how much the period between 2 MBMS Notification messages can be decreased as the counting process itself takes a certain time. After the UE received the MBMS notification start messages 105a and 105b, it needs to send an RRC connection request 113. After a certain time period the UE receives the MBMS UE linking request message 115 over the Iu. Therefore, in practice the MBMS notification cycle needs to be at least as long as the time period between the messages 113 and 115. As an example, assume that it takes 200 ms in between a UE sending an RRC CONNECTION REQUEST 113 and receiving the MBMS UE LINKING REQUEST message 115. In that case, the period in between two consecutive MBMS NOTIFICATION messages needs to be at least 200 ms.

Configuration of MBMS SERVICE INFORMATION message and MBMS RADIO BEARER INFORMATION Message As described above with reference to FIG. 3, MBMS service information is transmitted from the RNC to the UEs in two messages. The two messages are used to inform the UEs of all MBMS services available in one cell and to send the UEs radio bearer information relating to the MTCH. These two messages are the MBMS SERVICE INFORMATION message 107 and the MBMS RADIO BEARER INFORMATION message 109.

According to the 3GPP specification TS 25.346, MBMS SERVICE INFORMATION message is transmitted periodically to support the mobility in the MBMS service. The MBMS SERVICE INFORMATION message contains MBMS service IDs and ptm indication. The MBMS service IDs indicate the MBMS services which are being served in the cell or the MBMS services which can be served if the UE requests it. Ptm indication indicates that the MBMS service is on ptm in the cell, thus it informs the UE of the need of reception of the MBMS RADIO BEARER INFORMATION message. More information may be included in the MBMS SERVICE INFORMATION message.

MBMS RADIO BEARER INFORMATION includes MBMS Service ID, logical channel, transport channel and physical channel information for an MBMS service. More information may be included in MBMS RADIO BEARER INFORMATION.

It is noted that the 3GPP specification TS 25.346 specifies that both messages, i.e. the MBMS radio bearer information as well as the MBMS radio bearer information message include the service IDs, although the information in the specification relating to the content and structure of these messages is sparse.

However, it is important to set up the content and structure of the messages relating to the MBMS information in an efficient way. Particularly, the distribution of the information between the two messages is crucial in order to avoid duplication of information. For example, duplication of the service IDs or other information in the two messages may result in a waste of radio resources.

Second Embodiment

In the following it is described how the content and structure of the two MBMS information messages may be set up. A particular way of splitting the MBMS information into the MBMS service information and MBMS radio bearer information message is proposed and a way to avoid duplication or even multiplication of sending radio bearer information is described.

According to this embodiment, all service specific information appears only in a first message, referred to as the MBMS SERVICE AVAILABILITY message in the following, while the details of the radio resource configuration is included in a second message, i.e. the MBMS RADIO BEARER INFORMATION message.

It is noted that the existing model for mapping services and resources on to the radio interface as described in the 3GPP specifications is re-used for MBMS as much as possible.

Figure 5:
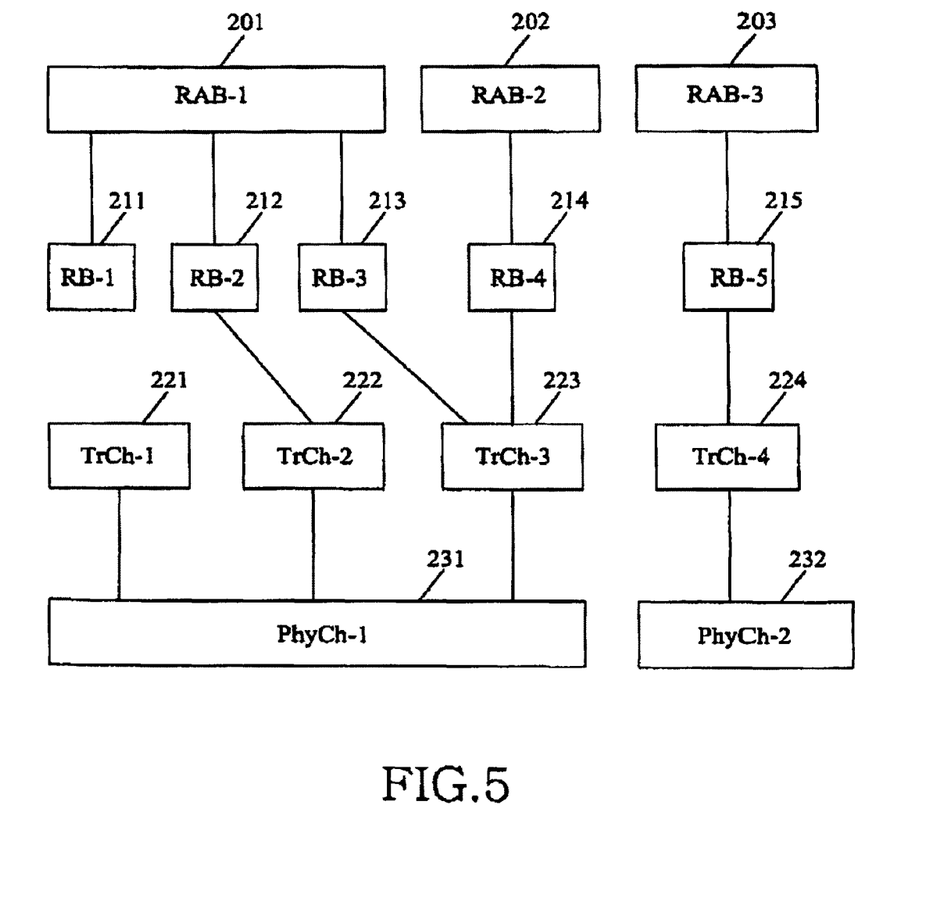
FIG. 5 is a schematic illustration of mapping MBMS services according to one embodiment of the present invention.

Referring now to FIG. 5, an example is given to illustrate the principle of mapping MBMS services and resources in the same manner on the radio interface as other services.

The structure of FIG. 5 includes three different radio access bearers 201 to 203, five radio bearers 211 to 215, four different transport channels 221 to 224 and two different physical channels 231 and 232.

The mapping structure used for the MBMS service is the following: One MBMS service maps onto a single RAB, which maps to one or more RBs, i.e. the use of RAB sub-flows is not excluded. Each RB corresponds to an MTCH logical channel. One or more of these logical channels may be mapped onto a FACH transport channel, and one or more of these transport channels are mapped onto a physical channel.

Thus, each of the three RABs 201 to 203 corresponds to one MBMS service. Of these three RABs, one RAB (RAB 201) maps to the three RBs 211, 212 and 213, whereas the other two RABs 202 and 203 each correspond to RB 214 and 215, respectively.

RB 211, 212 and 215 then map onto the transport channel (TrCh) 221, 222 and 224, respectively, whereas both RBs 213 and 214 corresponds to transport channel 223.

Moreover, the transport channels 221, 222 and 223 all correspond to physical channel (PhCh) 231, whereas transport channel 224 maps onto physical channel 232.

Thus FIG. 5 illustrates that, for example, a physical channel can carry multiple transport channels, and that a transport channel can carry multiple RBs.

The transport channel is indicated within the RB mapping information. Since the transport channel identity is unique within the scope of a physical channel both the transport channel identity and the Secondary Common Control Physical Channel (S-CCPCH) identity need to be included in the RB mapping info.

Several MBMS services can use the same radio bearer configuration. The same applies for the transport channel configuration. To provide efficient signalling support for this, the MBMS RADIO BEARER INFORMATION contains a number of pre-defined radio bearer and transport channel configurations. For each service, the MBMS SERVICE AVAILABILITY message then includes a pointer to one of the radio bearer configurations, and one of the transport channel configurations and one of the physical channels listed in the MBMS RADIO BEARER INFORMATION message. As can be seen from FIGS. 3 and 4, both the MBMS service availability message as well as the MBMS radio bearer information message are transmitted via the MCCH channel.

In this way an efficient way of signalling the information required to set up an MBMS p-t-m radio bearer can be achieved by two different aspects.

Firstly, duplication of the service identities is avoided, as the MBMS RADIO BEARER INFORMATION message does not contain the service IDs, but the MBMS Service Availability Message. Thus the amount of data to be transmitted on the MCCH can be considerably reduced. As an example, consider that there are 16 active MBMS sessions in parallel, and assume a service identity of 32 bit and a UE DRX cycle of 640 ms. By applying the above described approach of splitting the MBMS service information, the transmission rate on the MCCII can be reduced by almost 1 kbps.

Secondly, if several MBMS services share the same radio bearer and transport channel configuration further gains are achieved when several MBMS services use the same pre-defined radio bearer, transport channel and physical channel configurations. Instead of repeating the entire configuration for each service, the configuration elements are included once in the Radio Bearer Information message, and for each service a pointer to one of these pre-defined configurations is included in the Service Availability message. In this way, the signaling of information relating to the set-up of MBMS messages can be made much more efficiently.

Below, example message layouts are shown for an MBMS service availability message (Table 1) and for an MBMS Radio Bearer Information message (Table 2) according to one embodiment of the present invention.

Referring now to Table 1, the content and structure of the MBMS service availability message is described. It is noted that the symbol ">" indicates a hierarchical structure.

The first column of tables 1 and 2 specifics the Information element or group name of the information included in the two messages. Column 2 indicates whether the information is mandatory (Mandatory Present—MP) or optional (Optionally Present—OP), or whether this has not been agreed (For Further Studies—FFS). The third column indicates the size of the list, whereas the forth column indicates a rough estimate of the total size of the information element (in bits). In the fifth column additional information or comments regarding the size estimate for the different elements are provided.

The first information element of the MBMS service availability message in row 1 of Table 1 includes the message type, which indicates the type of the message and whether the message includes in addition any extension bits. The next element is the service list, listing all provided MBMS services. Up to 32 MBMS services are simultaneously available in a cell message. The list includes the MBMS service identities (IDs) as listed in row 3, and two further fields indicating whether a Packet Mobility Management (PMM) connection is required and the choice of transfer modes (rows 4 and 5). Rows 5 and 6 gives the choice of transfer modes as either ptp or ptm. Row 7 includes the RAB information, which is required to set up the ptm radio bearer and is provided for the MBMS services using this transfer mode.

Row 8 indicates the list of required radio bearer information. The list includes the RB identity and the RB mapping information as listed in rows 9 and 10. Those two fields include the pointers to the RB information provided in the MBMS radio bearer information message. The RB identity identifies a RB configuration included in the MBMS radio bearer information message. Up to 32 RBs can be identifies in a cell. The RB mapping information includes a pointer to the logical channel, to the transport channel and to the SCCPCH, i.e. the RB mapping information includes the identities of the logical channel, the transport channel and the SCCPCH.

The last row indicates the estimated total message size for one particular case. In this case the number of ptp and ptm connections is assumed to by 8 and the number of radio bearers used in assumed to be 1. In this case the total message size can be estimated to be 771 according to the following calculation:

$$11+(34*N\_ptp)+(34+(3+N\_rb*24)*N\_ptm)=771 \text{ for } N\_ptp=N\_ptm=8 \text{ and } N\_rb=1)$$

In a typical set-up each MBMS service maps onto a single RB while the different services are all mapped onto the same FACH, MAC/logical channel multiplexing is applied. In this case, each logical channel identifier value, used within the MAC header, identifies a specific MBMS service.

Referring now to Table 2, the content and structure of the MBMS radio bearer message is described.

Again, the first element is the message type (row 1). After this, the message includes a list of predefined the point-to-multipoint RB information configurations, transport channel configurations and physical channel configurations (rows 2, 7 and 15).

The RB information includes the RB identifies, Packet Data Convergence Protocol (PDCP) information, Forward Error Correction (FEC) information and Radio Link Control (RLC) information (rows 3 to 6). For the following, it is assumed that the message size required for the RB identity is 7 bits, for the FEC information 20 bits, for the PDCP information 49 bits (for a single algorithm such as the Robust Header Compression (ROHC) and a single profile), and that the size for the RLC information using UM/TM segmentation is 5 bits, the total size for the RB information list is given by 7+81*N_rb, whereby N_rb denotes the number of radio bearers listed in the message.

The SCCPCH list includes the SCCPCH identity (row 8), the Transport Format Combination Set (TFCS) (row 9), a list of the FACH (rows 10 to 13) and a PICH information (row 14). The list of FACH includes the transport channel identities, the Transport Format Set (IFS) and the Common Traffic Channel (CTCH) indicators. Using the estimates provided in the last column, the total size for the SCCPCH list is given by 144 bits for a single SCCPCH. Every additional SCCPCH adds another 140 bits. It is noted that even though it has not yet been decided whether the fields including PDCP and FEC is mandatory, corresponding parameters have been included in the size estimate.

The physical channel configuration is provided in the Secondary CCPCH information of row 15. The estimated size of the Secondary CCPCH information list is 14 to 26 bits, including secondary scrambling code and timing offsets.

From the above it can be seen that for a typical MBMS configurations (assume 16 active MBMS services mapped on one RB, FACH and sCCPCH) both message have a comparable size.

MBMS Service Availability

TABLE 1

| Information element/Group name | Need | Value | Size | Comment |
|---|---|---|---|---|
| Message type | MP | | 5 | Overhead of message type, extension bit |
| Service list | OP | maxMBMSservPerPage | 6 | Up to 32 MBMS services simultaneously available in a cell message |
| >Service ID | MP | | 32 | MBMS service identity eg. TMGI |
| >PMM connection required | MP | | 1 | |
| >CHOICE Transfer mode | MP | | 1 | |
| >>PTP | | | 0 | (no data) |
| >>PTM | | | | |
| >>>RAB information to setup | MP | | | |
| >>>> RB information to setup list | MP | maxRBperRAB | 3 | |
| >>>>>RB identity | MP | | 5 | Identifies a RB configuration included in the MBMS RADIO BEARER INFORMATION message. Up to 32 RBs can be identified in a cell |
| >>>>>RB mapping info | MP | | 19 | Including the logical channel identity, as well as the transport channel identity and an S-CCPCH identity (requires a modified version of the existing data structure) |
| Total message size | | | 771 | 11 + (34 * Nptp) + (34 + (3 + Nrb * 24) * Nptm) 771 for the reference case (Nptp = Nptm = 8 and Nr = 1) |

MBMS Radio Bearer Information

TABLE 2

| Information element/Group name | Need | Value | Size | Comment |
|---|---|---|---|---|
| Message type | MP | | 5 | Overhead of message type, extension bit |
| PTM RB info list | MP | maxMBMS-RBperCell | 7 | 7 + (81 * Nrb) |

TABLE 2-continued

| Information element/Group name | Need | Value | Size | Comment |
|---|---|---|---|---|
| >RB identity | MP | | 7 | |
| >PDCP info | FFS | | 49 | Single algorithm (ROHC), single profile |
| >FEC info | FFS | | 20 | Just a wild guess |
| >RLC info | MP | | 5 | UM/TM, segmentation |
| SCCPCH list | MP | maxSCCPCH | 4 | 4 + ((80 + 60 * Nfach) * Nsccpch) 144 for a single S-CCPCH. Every S-CCPCH adds 140 (if the same assumptions apply) |
| >SCCPCH identity | MP | | 4 | maxSCCPCH equals 16 |
| >TFCS | MP | | 50 | Just the 6 TFs |
| >FACH list | MP | maxFACHPCH | 3 | 63 for a single FACH with 6 TFs. Each additional FACH may add 60+ (depending on TFS and TFCS impact) |
| >>Transport channel identity | MP | | 5 | |
| >>TFS | MP | | 54 | (0x320, 1x320, 2x320, 4x320, 8x320, 16x320) @ 80 ms TTI |
| >>CTCH indicator | MP | | 1 | |
| >PICH info | OP | | 1 | Absent; N/A for S-CCPCH carrying MTCH |
| >Secondary CCPCH info | MP | | 26 | 14 up to 26 (secondary scrambling code & timing offset included) |
| Total message size | | | 808 | 16 + (81 * Nrb) + ((84 + 60 * Nfach) * Nsccpch) 804 assuming Nrb = 8 (each PTM service having a separate RB configuration), single S-CCPCH, single FACH and TF/TFCS as indicated |

Third Embodiment

Alternatively to the embodiment described above, avoiding of information duplication can also achieved by providing only a single MBMS information message instead of having an MBMS service information message and a separate MBMS radio bearer information message. Therefore, according to this embodiments all MBMS information contained in the two messages described above are combined in a single MBMS information message by using a simple concatenation of the two separate messages indicated above.

However, the approach of having two separate messages as described above has the additional advantage that one of the two messages can be transmitted more frequently than the other.

Apart from the MBMS session start, the MBMS SA and RB message are also used for handling the mobility of UEs while receiving MBMS services. If a UE in an RRC-IDLE state moves into a new cell, the UE has to find out if and how an MBMS service is supported in a cell. If the service is supported by ptm transmission in the new cell, the UE will only have to read the MBMS SA and MBMS RB messages. Subsequently, the UE can receive the MTCH channel.

If, on the other hand, the service is supported by ptp transmission in the new cell, the UE will have to establish an RRC Connection, go to the PMM_CONNECTED state and wait for the RB SETUP for the RB of the MBMS service. It is apparent that this procedure is relatively slow.

However, the UE only needs to receive the MBMS SA message and not the MBMS RB information to detect that an MBMS service is supported by ptp. Therefore, the service interruption for a UE moving into the new cell can be significantly reduced by scheduling the MBMS SA message more frequently than the MBMS RB message.

Thus, by having two separate messages rather than one combined message, the MBMS SA message frequency can be increased without the need of increasing the frequency of the MBMS RB message. In this way an additional load due to inclusion of RB information in one message can be avoided while increasing the frequency of the MBMS SA message.

Whilst the above described embodiments have been described in the context of UMTS, it is appreciated that the present invention can also be applied to other similar. For UMTS, it is expected to be applicable to all releases.

Whilst in the above described embodiments it has been described that the MBMS RB information message is transmitted on the MCCH, it is appreciated that alternatively some of the information indicated in the MBMS RB INFORMATION message could be transported on the BCCH instead. For example, if the MCCH is multiplexed with MTCH's, then in order to be able to find the MCCH, the sCCPCH information for the sCCPCH carrying the MCCH can be provided on the BCCH. In this case the MBMS RB INFORMATION message may just include a reference to the corresponding sCCPCH configuration when indicating the mapping of an MTCH. However, it is advantageous that this multiplexing option is only used when the transport channel and physical channel configuration is relatively static, otherwise the BCCH will need to be updated to frequently.

It is noted that throughout this document the term "message" is used to include both indicators and messages, i.e. a message may either include only a single indication, or may include a message comprising different information elements.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method of providing a point-to-point multicast service for transmitting data from a network element to a plurality of terminals in a communication system, the method comprising:
    transmitting service available information from the network element to the plurality of terminals; and
    transmitting radio bearer information from the network element to the plurality of terminals,
    wherein the service available information includes a pointer to predefined radio bearer configurations, transport channel configurations, and physical channel configurations listed in the radio bearer information.

2. The method of claim 1, wherein at least one of the service available information and the radio bearer information is transmitted on a multicast control channel.

3. The method of claim 1, wherein the radio bearer information includes at least one of a radio bearer configuration, a transport channel configuration, and a physical channel configuration listed in the radio bearer information.

4. The method of claim 1, wherein the service available information and the radio bearer information are transmitted on different frequencies.

* * * * *